United States Patent [19]

Mathis et al.

[11] Patent Number: 4,934,785
[45] Date of Patent: Jun. 19, 1990

[54] OPTICAL FIBER CONNECTOR

[75] Inventors: Terry D. Mathis, Lilburn; Calvin M. Miller, Roswell, both of Ga.

[73] Assignee: American Telephone and Telegraph Company, New York, N.Y.

[21] Appl. No.: 314,683

[22] Filed: Feb. 23, 1989

Related U.S. Application Data

[63] Continuation of Ser. No. 527,341, Aug. 29, 1983, Pat. No. 4,850,670.

[51] Int. Cl.$^5$ .............................................. G02B 6/38
[52] U.S. Cl. ................................ 350/96.21; 350/96.20
[58] Field of Search ................ 350/96.20, 96.21, 96.22

[56] References Cited

U.S. PATENT DOCUMENTS

| | | | |
|---|---|---|---|
| 3,734,594 | 5/1973 | Trambarulo | 350/96.21 |
| 3,803,409 | 4/1974 | Prochazka | 250/227 |
| 4,088,387 | 5/1978 | Lewis | 350/96.15 |
| 4,101,198 | 7/1978 | Heldt | 350/96.20 |
| 4,135,781 | 1/1979 | Archer | 350/96.20 |
| 4,150,870 | 4/1979 | d'Auria | 350/96.16 |
| 4,179,186 | 12/1979 | Tynes | 350/96.21 |
| 4,184,740 | 1/1980 | d'Auria et al. | 350/96.16 |
| 4,193,665 | 3/1980 | Arnold | 350/96.22 |
| 4,205,897 | 6/1980 | Stankos | 350/96.21 |
| 4,220,398 | 9/1980 | Dalgoutte | 350/96.21 |
| 4,257,671 | 3/1981 | Barbaudy et al. | 350/96.15 |
| 4,261,642 | 4/1981 | Lewis et al. | 350/96.20 |
| 4,390,237 | 6/1983 | Marazzi | 350/96.20 |
| 4,487,474 | 12/1984 | Nishie et al. | 350/96.21 |
| 4,541,685 | 9/1985 | Anderson | 350/96.21 |

FOREIGN PATENT DOCUMENTS

| | | |
|---|---|---|
| 1068953 | 1/1980 | Canada . |
| 0052014 | 5/1982 | European Pat. Off. . |
| 2741367 | 12/1978 | Fed. Rep. of Germany . |
| 0115009 | 9/1980 | Japan ............ 350/96.2 |
| 56-138706 | 10/1981 | Japan ............ 350/96.21 |
| 56-165109 | 12/1981 | Japan . |
| 0068709 | 4/1983 | Japan ............ 350/96.2 |
| 2058392 | 4/1981 | United Kingdom . |
| 1599688 | 10/1981 | United Kingdom . |

OTHER PUBLICATIONS

"Rapid Field Termination of an SMA Fiber Optic Connector", R. Schultz, *Proceedings of the Optical Fiber Conference*, Los Angeles, Sep. 1982, pp. 165-170.
"UV-Curable Adhesive Bonds Optical Fiber to Connector", *Design News*, 12/6/82, pp. 60-61.
Masuda, S, "Variable Attenuator for Use in Single-Mode Fiber Transmission Systems", *Applied Optics*, vol. 19, No. 14 (15 Jul. 1980), pp. 2435-2438.
Shimizu, N., "Single-Mode Optical Connector", *Electronics and Communications in Japan*, vol. 62-C, No. 4, (Apr. 1979), pp. 79-87.
"Low Cost Cables For Optical Data Link", by S. Minami et al., *8079 IEEE Electro*, vol. 7 (1982) May, New York, U.S.A., pp. 1-8.

*Primary Examiner*—John D. Lee
*Attorney, Agent, or Firm*—Eugen E. Pacher

[57] ABSTRACT

Disclosed is an optical fiber connector that comprises two right capillary cylinders or "plugs", an alignment sleeve that contactingly maintains the plugs in substantially fixed relative relation, and means for maintaining the plugs in substantially fixed relative axial relation. Connectors according to the invention can have very low insertion loss, are easily field-installed, can be easily and relatively inexpensively manufactured, and are useful for single mode as well as for multimode fiber applications. In a preferred embodiment the connector takes the form of the ST ® connector.

24 Claims, 4 Drawing Sheets

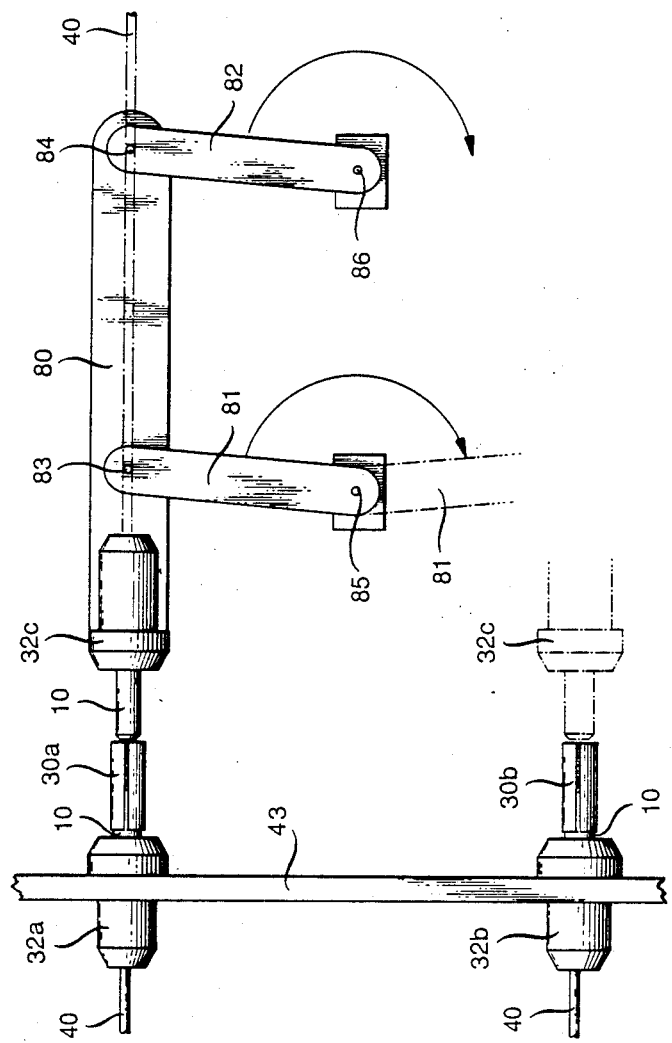

OPTICAL FIBER CONNECTOR

CROSS REFERENCE TO RELATED APPLICATION

This is a continuation of our copending application Ser. No. 527,341, filed on Aug. 29, 1983, now U.S. Pat. No. 4,850,670.

1. Field of the Invention

This invention pertains to splices and connectors for optical fiber.

2. Background of the Invention

Optical fiber connectors and splices (hereinafter referred to collectively as "connectors") are an essential part of substantially any optical fiber communication system. For instance, connectors may be used to join segments of fiber into longer lengths, or to connect fiber to active devices such as radiation sources, detectors, or repeaters, or to passive devices such as switches or attenuators.

The task of an optical fiber connector is twofold. First, it must couple or join two optical fibers with minimum insertion loss. Second, it must provide mechanical stability and protection to the junction in its working environment. Achieving low insertion loss in coupling two fibers is generally a function of the alignment of the fiber ends, the width of the gap between the ends, and the optical surface condition of either or both ends. Stability and junction protection is generally a function of connector design, e.g., minimization of differential thermal expansion effects.

The prior art knows many approaches to achieving fiber alignment. Among them are V-grooves, three-rod containment, resilient ferrules, elastomeric bushings, jewel bushings, conical nose/conical bushing, and precision ferrule/precision bushing devices. A discussion of some prior art connectors can be found, for instance, in R. Schultz, *Proceedings of the Optical Fiber Conference*, Los Angeles, (September 1982), pp. 165–170.

For example, U.S. Pat. No. 4,205,897, issued June 3, 1980 to W. C. Stankos, for "Fiber Optic Connector for Single Fiber," discloses a connector and coupling assembly for coupling a single pair of optical fibers in which the respective fibers are secured in identical metallic connector pins inserted into an alignment sleeve having a precision axial aperture. As a further example, U.S. Pat. No. 4,135,781, issued Jan. 23, 1979, to J. D. Archer, for "Optical Fiber Termination", discloses a method for terminating an optical fiber by means of a connector by pushing the plastic-clad optical fiber into a heater ferrule containing a pierced watch bearing jewel, so as to force the bare fiber through the aperture in the jewel, then fusing the protruding fiber end, and polishing the fused fiber end flush with the jewel surface.

A further example of prior art connectors is described by R. Schultz (op. cit.). (See also *Design News*, Dec. 6, 1982, pp. 60–61.) The connector described therein comprises a glass tube, factory-bonded to a metallic connector body assembly. Stripped fiber is threaded through the bore of the glass tube, and held in place therein by means of UV-curable adhesive. A metal ferrule is slipped over the length of fiber jutting from the glass tube/body assembly and held in place by means of a coupling ring. The fiber end protruding from the slightly concave ferrule surface is scribed and broken close to the ferrule. The ferrule can then be inserted without further processing into a mating bushing of an appropriate adapter or receptacle to complete a connection.

Prior art optical fiber connectors typically contain one or more precision machined parts and are therefore relatively costly items. Whereas this may be acceptable for some applications, e.g., in trunk lines, in other cases the price of connectors of the prior art type might constitute a significant fraction of the total installation price. An example of such an installation is considered to be a local area network (LAN), which usually would require many, perhaps hundreds, of fiber connectors.

A further and very important consideration is the relative ease of field installation of an optical fiber connector, since a complicated and lengthy installation procedure may significantly affect the installed price of a multiconnector optical fiber network. It is thus desirable that the installation of a connector not only be accomplishable within a relatively short period of time but also that the installation not require special skills, or manipulations not easily carried out in the field.

It is thus evident that an optical fiber connector whose parts can be easily and inexpensively produced, which can be quickly and simply installed by relatively unskilled personnel in the field, and which, furthermore, is compatible with all environmental conditions it is likely to encounter, and which has extremely low insertion loss, would be of great commercial importance. This application discloses such an optical fiber connector.

SUMMARY OF THE INVENTION

The inventive optical fiber connector is a device for abuttingly joining one optical fiber to another optical fiber. The connectors can assume a variety of forms, including the form of multichannel connectors, and is useful for connecting single mode fiber as well as for connecting multimode fiber. Furthermore, the principle of the inventive device can be embodied in other fiber-optic devices, e.g., a variable attenuator, a fiber-to-fiber switch, or a simple in-line optical fiber.

A complete connector according to the invention comprises two drawn capillary glass right circular cylinders, each cylinder having a "free" end face, alignment means, acting on the outside surfaces of the cylinders, for maintaining the cylinders in radially fixed relation to each other, and axial spring means for maintaining the free end faces of the cylinders in fixed axial relation to each other.

A connection is made by inserting the bared end of a fiber into the capillary bore of a cylinder, threading it through the length of the cylinder, followed by fixing the fiber in the capillary bore by appropriate (e.g., adhesive) means, and preparing the fiber end to be flush with the free end face of the cylinder, e.g., by grinding and/or polishing. Two similarly prepared cylinders are then maintained in radially and axially fixed relationship by the above-mentioned means, such as to permit at least a substantial fraction of electromagnetic radiation emitted from one fiber end to couple into the second fiber end.

The inventive connector contains only one type of precision element, namely, the two drawn capillary glass cylinders. This element can be easily and cheaply manufactured to within close tolerances. The fiber preferably fits relatively loosely into the capillary bore (diameter difference preferably between about 0.5 $\mu$m and about 5 $\mu$m), since the adhesive material typically filling the space between fiber and capillary wall apparently can exert a dynamic centering effect on the fiber during fiber insertion, resulting in an accurately concentric assembly.

BRIEF DESCRIPTION OF THE DRAWING

FIG. 8 shows schematically an embodiment of the invention adapted to function as a fiber-to-fiber switch.

Like features in the drawings are identified by like numerals.

DETAILED DESCRIPTION

One of the central aspects of this invention is the use of drawn glass capillary cylinders as the sole precision elements in a optical fiber connector. Methods for "drawing down" tubular glass preforms, to thereby produce a reduced-cross-section replica of the preform, as well known in the art and need no detailed exposition. It will, for instance, be readily apparent to those skilled in the art that the preform has to have substantially the same ratio of outer to inner diameter as the capillary cylinder. To achieve the required dimensions on the finished part, it may be necessary to change the outside diameter of an available glass tube by grinding, or to employ other appropriate procedures for achieving the required ratio in the preform.

A critical parameter of a glass capillary cylinder for use in a connector according to the invention is the bore eccentricity, which should be as small as possible, typically less than about 5 percent, preferably less than 2 percent. Bore eccentricity herein is defined as $\Delta/a$, where a is the capillary bore radius, and $\Delta$ the concentricity error, i.e., the amount by which the bore axis is shifted from the cylinder axis.

Figure 1:
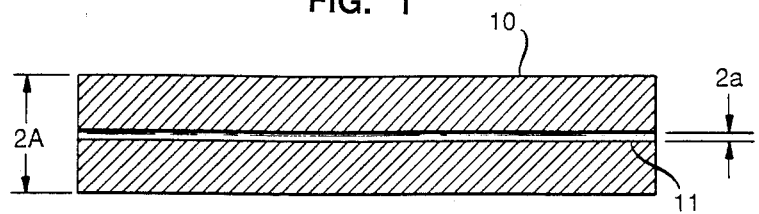
FIG. 1 shows an exemplary as-drawn and cut glass capillary cylinder.

FIG. 1 shows in cross-section an exemplary glass capillary cylinder substantially as drawn and then cut from the drawn capillary tube. Capillary cylinder 10 has outer diameter 2A, and substantially concentric bore 11 of diameter 2a. Exemplary approximate dimensions are $2A=2.5$ mm, $2a=0.13$ mm, and length about 12.5 mm. The cylinder can consist of any appropriate glass, e.g., PYREX, quartz, borosilicate or soda-lime glass.

Figure 2:
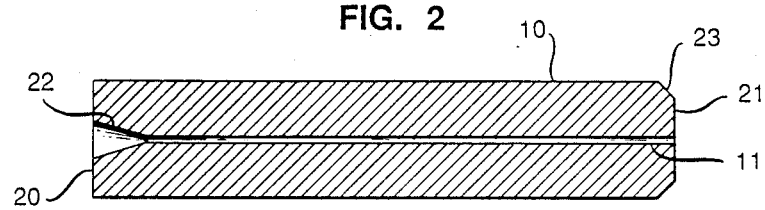
FIG. 2 depicts an exemplary chamfered and insertion-coned glass capillary cylinder.

An exemplary capillary cylinder suitable for incorporation into a connector according to the invention is shown in cross-section in FIG. 2. End faces 20 and 21 are prepared, e.g., by cutting or grinding, to be substantially perpendicular to the cylinder axis. Face 21, which is to be the "free" end face of the cylinder, in particular, should be accurately perpendicular, and also should have good surface finish. Fiber insertion into the bore is aided by means of fiber entry cone 22. Chamfer 23, as well as cone 22, can be produced by any appropriate means, e.g., by grinding, etching, or fire polishing. Presence of a fiber entry cone is not always necessary in the glass cylinder, since other ways of ensuring easy fiber into the capillary bore exist, e.g., an entry cone in the bore of the connector base.

A complete fiber connection according to the invention comprises, in addition to the two drawn glass capillary cylinders (which are not necessarily of equal length, but typically and closely matched in OD and bore diameter), alignment means for maintaining the cylinders substantially radially fixed with respect to each other. Although all means for achieving such alignment are intended to be within the scope of the invention, we have found that a simple alignment sleeve, i.e., a split, thin-walled cylinder made of metal (e.g., phosphor bronze, steel) or any other appropriate material (e.g., plastic), performs this function well.

An inventive connection also comprises means, typically comprising an elastically deformable body, e.g., a spring, for maintaining the two glass cylinders in axially fixed relation with each other. This relation is, at least in the case of a simple connector, a contacting one (with or without the presence of a thin layer of index-matching material between the free end faces). In this case, the free end faces of the two cylinders are maintained in contacting relationship by means of an axially applied force. For instance, we have found that a simple mounting clip, made of phosphor bronze, steel, plastic, or any other appropriate material, can perform this function.

Figure 3:
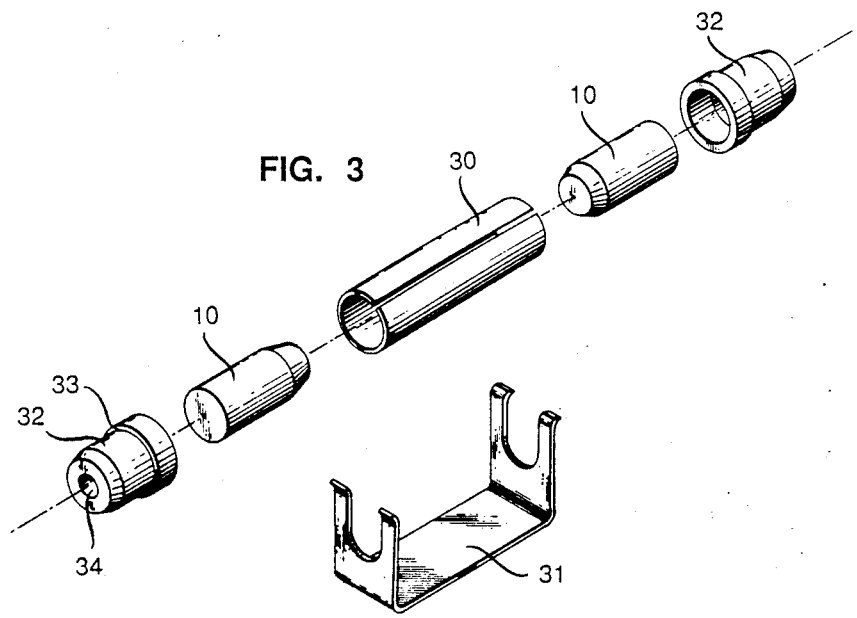
FIG. 3 gives in exploded view the parts of a connector according to the invention.

FIG. 3 shows, in exploded view, parts of a simple connector according to the invention, with glass cylinders 10 to be held in radially fixed relation by split alignment sleeve 30, and in axially fixed relation, in this case contacting relation, by mounting clip 31. Connector bases 32 serve, inter alia, to hold (in bore 34) the coated fiber in fixed relationship with respect to the connector, thereby reducing stress on the bare fiber end, and to provide means for applying the axial-position-maintaining force, e.g., shoulder 33. The connector base typically is a low precision part, e.g., an aluminum screw machine part, or an injection molded plastic part. However, the base advantageously provides centering means for the coated fiber. This can be achieved, for instance, by providing a relatively close fit between the coated fiber and the bore of the base.

A connector according to the invention can be assembled by, for instance, inserting an appropriately prepared drawn glass cylinder into a connector base, and attaching it permanently thereto, e.g., by means of epoxy, press-fit, or UV-curable adhesive (e.g., a diacrylate adhesive such as ACE 7515, manufactured by American Chemical Engineering Company). In the latter case, the base advantageously is fabricated from UV-transmitting material, e.g., polymethylmethacrylate (PMMA) or quartz.

Next, the coating is stripped from the end of a fiber, an appropriate adhesive (e.g., UV-curable or fast-curing epoxy) injected into the connector base, the stripped fiber end inserted through the base into the glass cylinder, and pushed forward until the fiber end emerges from the free end face of the cylinder and the coated fiber extends into the connector base. After curing of the adhesive, the protruding piece of fiber is removed (e.g., by scribing and breaking) and the fiber end polished flush with the base, for instance, by polishing on 8 $\mu$m, followed by 1 $\mu$m, polishing paper. After similarly preparing a second assembly, the connector can be completed by inserting both assemblies into an alignment sleeve, with or without index matching material (e.g., silicone gel) between the opposing end faces, and inserting the combination into a mounting clip.

Figure 4:
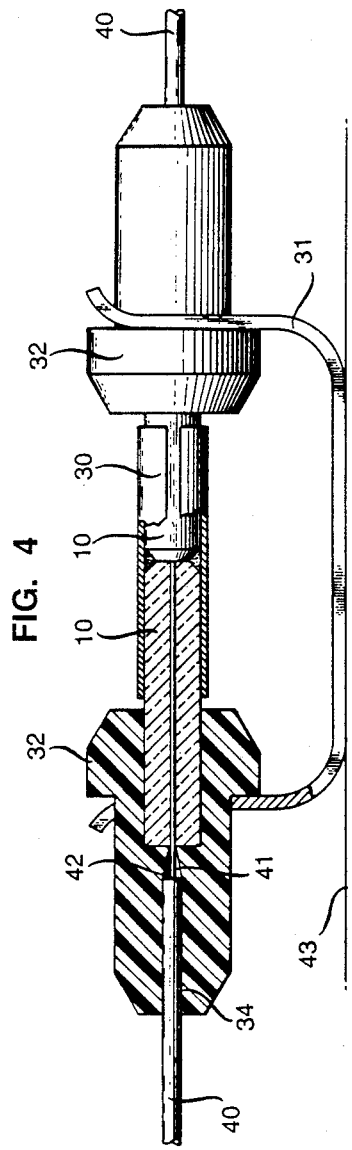
FIG. 4 shows in partial cross-section an assembled exemplary connector according to the invention.

An assembled exemplary inventive connector is shown in partial cutaway view in FIG. 4. Coated optical fiber 40 is inserted into connector base 32, preferably as far as insertion cone 42, with bare optical fiber 41 extending through glass cylinder 10. Adhesive is introduced into the base through bore 34. The assembled connector can be mounted on a solid object 43, e.g., a wall, by means of mounting clip 31.

Some of the adhesive introduced into the connector base is typically drawn into the bore of the glass cylinder, where its presence appears to have a dynamic centering effect when the fiber is inserted into the bore. In order to take advantage of this centering effect, as well as for other reasons, it is advantageous to choose the bore diameter and fiber diameters such that the fiber slides relatively easily into the bore, e.g., to result in a fit typically no tighter than a sliding fit. Typically, this means that the bore diameter $2a$ preferably exceed the diameter of the bare optical fiber by at least about 0.5 μm, but preferably by not more than about 5 μm.

In addition to the above-discussed exemplary embodiment of the invention, a wide variety of other embodiments exists, and those skilled in the art will undoubtedly produce still further variants. For instance, additional hardware can be added to the basic above-described connector to result in twist-lock or screw-in connectors of the type familiar for coaxial cable connection, or to provide for stress relief by means of a metal sleeve crimped to the coated fiber.

Figure 5:
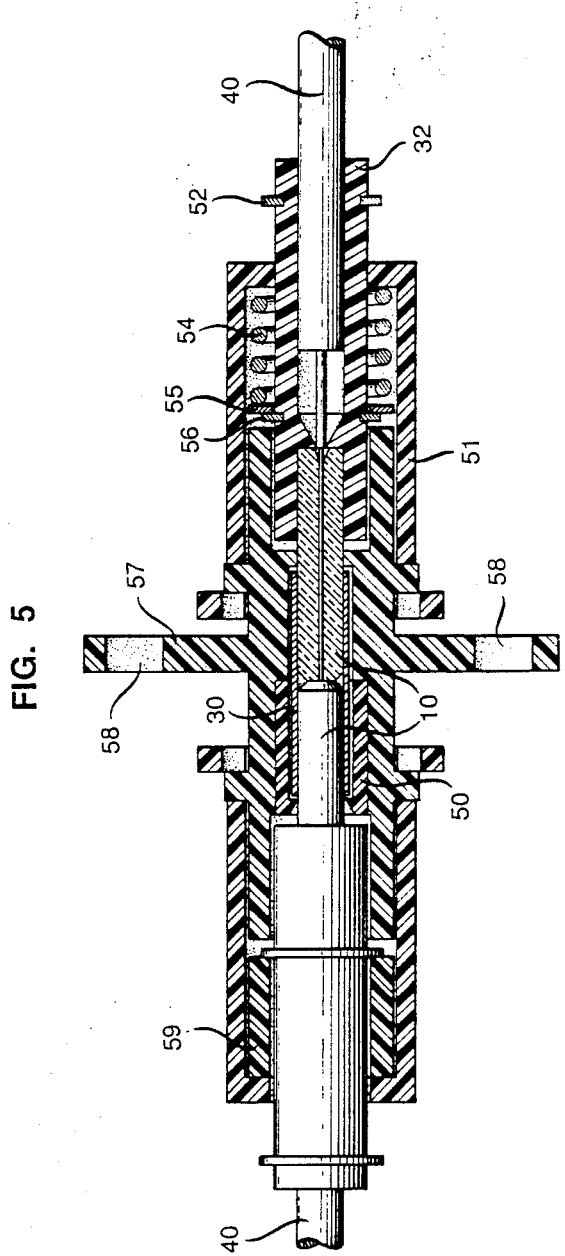
FIG. 5 illustrates a further exemplary embodiment of the invention, namely, a feed-through connector of the twist-and-lock type.

An example of a panel-mountable twist-and-lock type connector (i.e., a connector adapted for feeding a fiber channel through a panel or, more generally, a part of a solid object), is shown in FIG. 5. A single fiber cable 40 is held fixed in cable retainer and connector base 32, with the bare glass fiber inserted into drawn glass capillary cylinder 10 and extending therethrough, the capillary cylinder being maintained in fixed relation with respect to 32 by, e.g., adhesive means. The bare fiber and the cable are also typically maintained in fixed relation with respect to 10 and 32, respectively, by adhesive means. The above-described cable-terminating assembly is inserted into cap 51 and retained therein by means of retaining rings 56 and 52, with spring 54, acting against washer 55, providing axial force for maintaining the free end faces of glass cylinders 10 firmly in contact in the assembled connector. Panel mount 57 is typically affixed to a panel or the like by means of screws extending through openings 58. Into 57's central bore is inserted alignment sleeve 30, and maintained therein by sleeve retainer 50.

As can be seen from FIG. 5, the two cable-terminating assemblies to be joined are very similar, the major difference between them being the fact that only one assembly comprises spring 54, spacer 59 taking its place in the second assembly. It will be appreciated that an inventive connector of the type exemplified by FIG. 5 could be constructed to be completely symmetrical, or to differ in symmetry to a greater extent than the exemplary depicted embodiment.

To complete the cable connection, one of the glass cylinders, e.g., the one forming part of the "left-hand" assembly of FIG. 5, is inserted into sleeve 30, and the left-hand assembly is attached to 57 by means of the twist-and-lock arrangement depicted. Subsequently the right-hand glass cylinder is inserted into 30, and the assembly secured as above, with spring 54 not only serving to maintain the glass cylinder end faces pressed against each other but also providing locking compression on the two twist-and-lock connections of the connector assembly.

Figure 6:
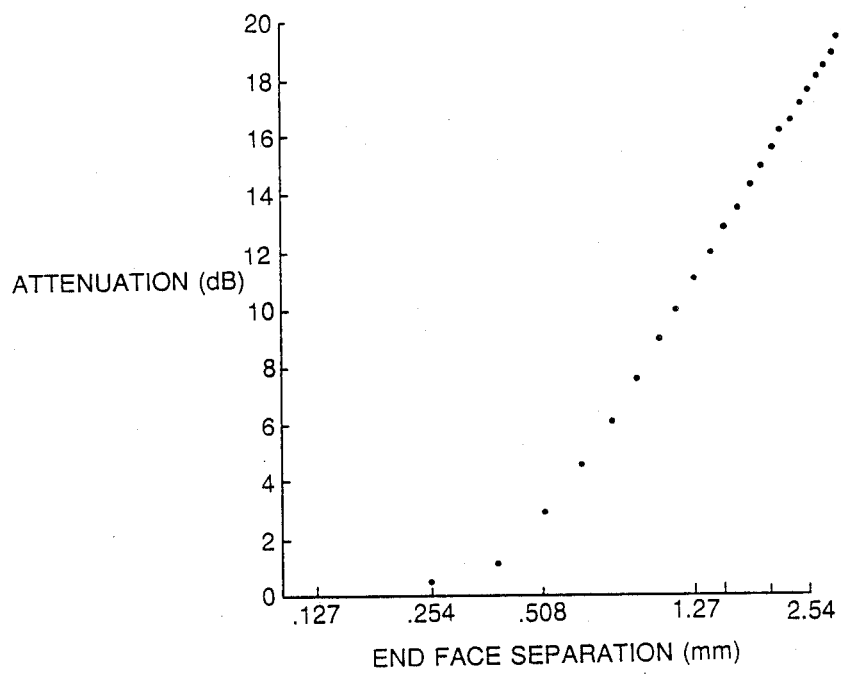
FIG. 6 gives exemplary experimentally obtained data on connector insertion loss vs. cylinder end face separation.

FIG. 6 shows experimentally obtained data on connector loss as a function of capillary cylinder end face separation. As can be seen, the insertion loss is a strong function of end face separation in a connector according to the invention, attenuation in db increasing typically linearly with the logarithm of the separation above some separation, in the exemplary data, above about 0.4 mm separation.

Figure 7:
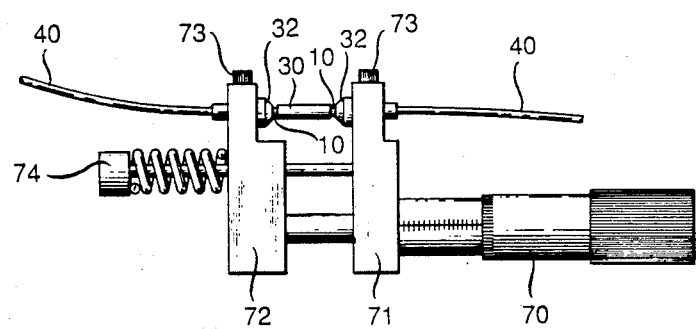
FIG. 7 shows schematically an embodiment of the invention adapted to function as a variable attenuator.

This phenomenon can be used advantageously to construct a variable attenuator, exemplified in FIG. 7. Buffered coated fibers 40 are maintained in connector base 32, the bare fiber ends inserted into glass capillary cylinders 10, and the cylinders inserted into alignment sleeve 30, substantially as described above. The connector assembly is mounted in micrometer jaws 71 and 72, held in place by means of set screws 73, the distance between the jaws being controllably variable by means of micrometer 70, with rod-and-spring assembly 74 serving to eliminate play in the movement. FIG. 7 is intended to illustrate, by means of a simple and workable embodiment, the principle of a variable attenuator according to the invention. Those skilled in the art will be readily able to devise other embodiments of the invention, based on the principles disclosed herein.

Other variations of the inventive connector exist. For instance, optical filter material can be placed between the opposing end faces of the two glass cylinders, either in the basic connector assembly (exemplified in FIG. 4), in other connector configurations (e.g., as exemplified in FIG. 5), or in adaptations of the invention, e.g., as the variable attenuator exemplified in FIG. 7. Such a filter could be used to improve the spectral purity of a signal, or to isolate a signal in a wavelength-multiplexed optical communication system.

A further embodiment of the inventive connector, namely, a 1×2 fiber-to-fiber switch, is depicted schematically in FIG. 8. Connector bases 32a and 32b are mounted in switch housing 43, and base 32c is movably held inside the housing. Capillary cylinders 10 are attached to the bases, coated fibers 40 mounted, and bared fiber ends prepared, as described above. Base 32c is mounted in link 80, part of a 4-bar mechanism (further comprising bars 81 and 82, and pins 83–86) attached to the switch housing. This arrangement allows insertion of the moving capillary cylinder 10 either into alignment sleeve 30a or 30b. Means for attaching the 4-bar mechanism to the housing, means for maintaining the appropriate axial relation between the abutting capillary cylinders, means for activating switch movement, and the like, can be conventional and are not shown.

Furthermore, it will be appreciated that, although the discussion above is in terms of single-channel connectors, the invention can be embodied in multi-channel connectors, e.g., by means of multiplicity of connectors mounted in a common frame, or plug and socket.

As is apparent from the above description, connectors according to the invention utilized mechanical means, e.g., an alignment sleeve, for maintaining the two capillary glass cylinders in radially fixed relation to each other, with the outer cylinder surfaces being the alignment reference surfaces. In other words, the mechanical means are adapted for maintaining the outer cylinder surface of a first cylinder substantially concentric with the outer cylinder surface of a second similar cylinder. This method of alignment precludes radial adjustment of one cylinder against the other, to thereby maximize the transmitted signal strength, as is common practice in many prior art single mode connectors, and we do not contemplate connectors that employ such radial adjustment to be within the scope of our invention. However, the disclosed method of alignment permits rotation of one cylinder with respect to the other, and connectors that allow for such fiber alignment are contemplated to be within the scope of the invention.

In particular, such rotational alignment is particularly advantageous in single mode fiber connectors according to the invention. We have fabricated such connectors (of construction substantially as shown in FIG. 4) that utilize "matched" pairs of capillary cylinders, i.e., cylinders that were adjacent each other in the drawn glass capillary tube, and have obtained connections having very low insertion losses, often below 0.1 db. Of course, if cylinders have sufficiently low eccentricity are available, use of matched pairs may not be necessary.

It will be understood that, after rotational adjustment, it may be desirable to fix the cylinders in their relative relationship, and any means for doing this, including adhesive means, are contemplated to be within the scope of this invention.

We claim:

1. A connector for radiation-transmissively connecting an end of an optical fiber to an end of another optical fiber, said connector comprising two fiber termination means, each fiber termination means comprising
   (a) a basically cylindrical plug including an end face in which an associated fiber is to terminate, and a passageway which terminates in said end face and which is adapted to receive an uncoated end portion of the associated optical fiber that is to be terminated by said plug;
   (b) base means for holding an end portion of the plug and comprising an axial bore which is aligned with the passageway of the plug in a direction along a longitudinal axis of said connector; at least one fiber termination means further comprising
   (c) spring means disposed about said base means;
   (d) cap means for enclosing at least a portion of said base means and said spring means;
   (e) confinement means adapted for causing the spring means to urge the base means and the associated plug in a generally longitudinal direction with respect to the cap means; the connector further comprising
   (f) an alignment sleeve adapted to contactingly receive at least an end portion of each of said two plugs in a manner to cause the passageways to be aligned generally in a longitudinal direction; and
   (g) housing means for holding said alignment sleeve and comprising means for securing the two fiber termination means to the housing means such that the end faces of the plugs are maintained in radiation-transmissive relationship.

2. The connector of claim 1, wherein the housing means and the cap means comprise mating twist-and-lock means, with the spring means adapted for providing locking compression on the twist-and-lock means.

3. The connector of claim 1, wherein the spring means comprise a spiral spring that rests against a lip in the cap means and also rests against spring retaining means secured to the base means, and wherein the connector comprises means, secured to the base means, for retaining the base means in the cap means.

4. The connector of claim 1, wherein the passageway is of essentially uniform diameter throughout the length of the plug, but not excluding the optional presence of an entry cone and/or of a chamfer.

5. A connector for radiation-transmissively connecting an end of an optical fiber to an end of another optical fiber, said connector comprising two fiber termination means, each fiber termination means comprising
   (a) a basically cylindrical plug including an end face in which an associated fiber is to terminate, and a passageway which terminates in said end face and which is adapted to receive an uncoated end portion of the associated optical fiber that is to be terminated by said plug;
   (b) base means for holding an end portion of the plug and comprising an axial bore which is aligned with the passageway of the plug in a direction along a longitudinal axis of said connector, at least one fiber termination means further comprising
   (c) spring means disposed about said base means;
   (d) cap means for enclosing at least a portion of said base means and said spring means;
   (e) confinement means adapted for causing the spring means to urge the base means and the associated plug in a generally longitudinal direction with respect to the cap means; the connector further comprising
   (f) an alignment sleeve adapted to contactingly receive at least an end portion of each of said two plugs in a manner to cause the passageways to be aligned generally in a longitudinal direction; and
   (g) housing means for holding said alignment sleeve and comprising means for securing the two fiber termination means to the housing means such that the end faces of the plugs are maintained in radiation-transmissive relationship.

6. The connector of claim 5, wherein the housing means and the cap means comprise mating twist-and-lock means, with the spring means adapted for providing locking compression on the twist-and-lock means.

7. The connector of claim 5, wherein the spring means comprise a spiral spring that rests against a lip in the cap means and also rests against spring retaining means secured to the base means, and wherein the connector comprises means secured to the base means, for retaining the base means in the cap means.

8. The connector of claim 5, wherein the coated portion is to be maintained in the bore of the base means by adhesive means.

9. An article for terminating an optical fiber comprising
   (a) a basically cylindrical plug comprising an end face in which an associated fiber is to terminate, and a passageway which terminates in said end face and which is adapted to receive an uncoated end portion of the associated fiber;
   (b) base means for holding an end portion of the plug and comprising an axial bore which is aligned with the passageway in a direction along a longitudinal axis of the article;
   (c) first means disposed about said base means;
   (d) cap means for enclosing at least a portion of said base means and said first means; and
   (e) confinement means adapted for confining the first means in a longitudinal direction.

10. The article of claim 9, wherein the first means are spring means, and wherein the confinement means are adapted for causing the spring means to urge the base means and the associated plug in the generally longitudinal direction with respect to the cap means.

11. The article of claim 9, wherein the first means are spacer means.

12. The article of claim 9, wherein the passageway is of essentially uniform diameter throughout the length of the plug, but not excluding the optional presence of an entry cone and/or of a chamfer.

13. A terminated optical fiber which comprises an optical fiber end portion and an article for terminating the optical fiber, the article for terminating the optical fiber comprising
   (a) a basically cylindrical plug comprising an end face in which the associated fiber terminates, and a passageway which terminates in said end face and in which an uncoated end portion of the associated fiber is maintained;
   (b) base means for holding an end portion of the plug and comprising an axial bore which is aligned with the passageway in a direction along a longitudinal axis of the article;
   (c) first means disposed about said base means;
   (d) cap means for enclosing at least a portion of said base means and said first means; and
   (e) confinement means adapted for confining the first means in a longitudinal direction.

14. The terminated optical fiber of claim 13, wherein the first means are spring means, and wherein the confinement means are adapted for causing the spring means to urge the base means and the associated plug in the generally longitudinal direction with respect to the cap means.

15. The terminated optical fiber of claim 13 wherein the first means are spacer means.

16. The terminated optical fiber of claim 13, wherein the passageway is of essentially uniform diameter throughout the length of the plug, but not excluding the optional presence of an entry cone and/or of a chamfer.

17. An article for terminating an optical fiber comprising
   (a) a basically cylindrical plug comprising an end face in which an associated fiber is to terminate, and a passageway which terminates in said end face and which is adapted to receive an uncoated end portion of the associated fiber;
   (b) base means for holding an end portion of the plug and comprising an axial bore which is aligned with the passageway in a direction along a longitudinal axis of the article;
   (c) first means disposed about said base means;
   (d) cap means for enclosing at least a portion of said base means and said first means; and
   (e) confinement means adapted for confining the first means in a longitudinal direction, wherein
   (f) the base means are adapted for receiving a coated portion of the associated fiber.

18. The article of claim 17, wherein the first means are spring means, and wherein the confinement means are adapted for causing the spring means to urge the base means and the associated plug in the generally longitudinal direction with respect to the cap means.

19. The article of claim 17, wherein the first means are spacer means.

20. The article of claim 17, wherein the coated portion is to be maintained in the bore of the base means by adhesive means.

21. A terminated optical fiber which comprises an optical fiber end portion and an article for terminating the optical fiber, the article for terminating the optical fiber comprising
   (a) a basically cylindrical plug comprising an end face in which the associated fiber terminates, and a passageway which terminates in said end face and in which an uncoated end portion of the associated fiber is maintained;
   (b) base means for holding an end portion of the plug and comprising an axial bore which is aligned with the passageway in a direction along a longitudinal axis of the article;
   (c) first means disposed about said base means;
   (d) cap means for enclosing at least a portion of said base means and said first means; and
   (e) confinement means adapted for confining the first means in a longitudinal direction, wherein;
   (f) the base means are adapted for receiving a coated portion of the associated fiber.

22. The terminated optical fiber of claim 21, wherein the first means are spring means, and wherein the confinement means are adapted for causing the spring means to urge the base means and the associated plug in the generally longitudinal direction with respect to the cap means.

23. The terminated optical fiber of claim 21, wherein the first means are spacer means.

24. The terminated optical fiber of claim 21, wherein the coated portion is maintained in the bore of the base means by adhesive means.

* * * * *